United States Patent
Ferguson et al.

(10) Patent No.: US 9,758,059 B2
(45) Date of Patent: Sep. 12, 2017

(54) MULTI-FUNCTION SEAT ACTUATOR

(71) Applicant: AMI Industries, Inc., Colorado Springs, CO (US)

(72) Inventors: Keith M. Ferguson, Colorado Springs, CO (US); Douglas E. Hoover, Colorado Springs, AZ (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 228 days.

(21) Appl. No.: 14/469,343

(22) Filed: Aug. 26, 2014

(65) Prior Publication Data
US 2016/0059737 A1   Mar. 3, 2016

(51) Int. Cl.
| | | |
|---|---|---|
| *F16H 27/02* | (2006.01) | |
| *B60N 2/02* | (2006.01) | |
| *B60N 2/44* | (2006.01) | |
| *B60N 2/22* | (2006.01) | |
| *F16K 31/52* | (2006.01) | |
| *H02K 7/06* | (2006.01) | |
| *B64D 11/06* | (2006.01) | |
| *H02K 7/108* | (2006.01) | |
| *H02K 7/14* | (2006.01) | |

(52) U.S. Cl.
CPC ......... *B60N 2/0224* (2013.01); *B60N 2/0232* (2013.01); *B60N 2/0296* (2013.01); *B60N 2/2209* (2013.01); *B60N 2/443* (2013.01); *B60N 2/4435* (2013.01); *B64D 11/064* (2014.12); *B64D 11/06395* (2014.12); *F16K 31/52* (2013.01); *H02K 7/06* (2013.01); *H02K 7/108* (2013.01); *H02K 7/14* (2013.01)

(58) Field of Classification Search
CPC .. B60N 2/0224; B60N 2/0232; B60N 2/0296; B60N 2/2209; B60N 2/443; B60N 2/4435; B64D 11/06395; B64D 11/064; F16K 31/52; H02K 7/06
See application file for complete search history.

(56) References Cited

U.S. PATENT DOCUMENTS

| | | | | |
|---|---|---|---|---|
| 2,907,371 A | * | 10/1959 | Scott .................... | B60N 2/0232 248/419 |
| 2,983,545 A | * | 5/1961 | Garvey ................ | B60N 2/0232 248/419 |
| 3,188,044 A | * | 6/1965 | Epple ................... | B60N 2/0232 248/394 |

(Continued)

FOREIGN PATENT DOCUMENTS

| | | |
|---|---|---|
| EP | 1057725 | 12/2000 |
| EP | 2626581 | 8/2013 |

(Continued)

OTHER PUBLICATIONS

Extended European Search Report dated Jun. 13, 2016 in European Application No. 15182350.7.

*Primary Examiner* — Zakaria Elahmadi
(74) *Attorney, Agent, or Firm* — Snell & Wilmer L.L.P.

(57) ABSTRACT

A seat actuation control system is disclosed. The seat actuation control system may permit multiple functions to be controlled by a single actuator. For example, a seat floor tracking function, and a seat pan track and swivel function may be individually controlled by a single actuator, such as a rotary actuator.

12 Claims, 3 Drawing Sheets

(56) References Cited

U.S. PATENT DOCUMENTS

| | | | | |
|---|---|---|---|---|
| 3,890,000 | A * | 6/1975 | Easley | B60N 2/66 297/284.4 |
| 4,765,582 | A * | 8/1988 | Babbs | B60N 2/0232 248/394 |
| 5,735,500 | A * | 4/1998 | Borlinghaus | B60N 2/0232 248/157 |
| 6,626,064 | B1 * | 9/2003 | Maue | B60N 2/0228 297/344.13 |
| 8,746,773 | B2 * | 6/2014 | Bruck | B60N 2/22 296/65.16 |
| 8,864,210 | B2 * | 10/2014 | Bruck | B60N 2/0232 296/65.18 |
| 2002/0121803 | A1 | 9/2002 | Schooler | |
| 2004/0070250 | A1 * | 4/2004 | Cooley | B60N 2/12 297/344.1 |
| 2004/0222348 | A1 * | 11/2004 | Yokota | B60N 2/0232 248/429 |
| 2006/0075558 | A1 * | 4/2006 | Lambarth | A61G 1/0212 5/611 |
| 2009/0026791 | A1 * | 1/2009 | Ishijima | B60N 2/0296 296/65.18 |
| 2009/0026825 | A1 * | 1/2009 | Ishijima | B60N 2/0296 297/358 |
| 2013/0049411 | A1 * | 2/2013 | LaPointe | A61G 5/14 297/68 |
| 2015/0091338 | A1 * | 4/2015 | Hayashi | B60N 2/4435 297/180.1 |

FOREIGN PATENT DOCUMENTS

| | | |
|---|---|---|
| FR | 2711100 | 4/1995 |
| WO | 2009150502 | 12/2009 |
| WO | 2012123487 | 9/2012 |

\* cited by examiner

MULTI-FUNCTION SEAT ACTUATOR

FIELD

The present invention relates to the field of seat actuators, and more specifically, multi-function seat actuators.

BACKGROUND

Current electric rotary actuator driven mechanisms use a separate actuator to control separate functions. In applications having multiple functions to be controlled, such as seats which have a floor tracking control function and a seat pan track and swivel control function, multiple actuators are required. This requires heavy and complex actuation systems.

SUMMARY OF THE INVENTION

A seat actuation system is provided. A seat actuation system may include an actuator connected to an output interface, a primary output link in mechanical communication with the output interface, and a secondary output link in mechanical communication with the output interface. The output interface may include an apparatus whereby a first movement of the actuator is conveyed to the primary output link and a second movement of the actuator is conveyed to the secondary output link. The seat actuation system may also include a primary function control movable by the primary output link, a secondary function control movable by the secondary output link, and a lost motion slot disposed between the secondary function control and the secondary output link, whereby the secondary function control is mechanically isolated from the first movement of the actuator.

A method of multi-function seat actuation control is provided. The method may include rotating an actuator in a counterclockwise direction, exerting a counterclockwise actuation force on a secondary function control in response to the counterclockwise rotating, and disconnecting, by a lost motion slot, a primary function control from receiving the counterclockwise actuation force in response to the counterclockwise rotating.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Figure 1:
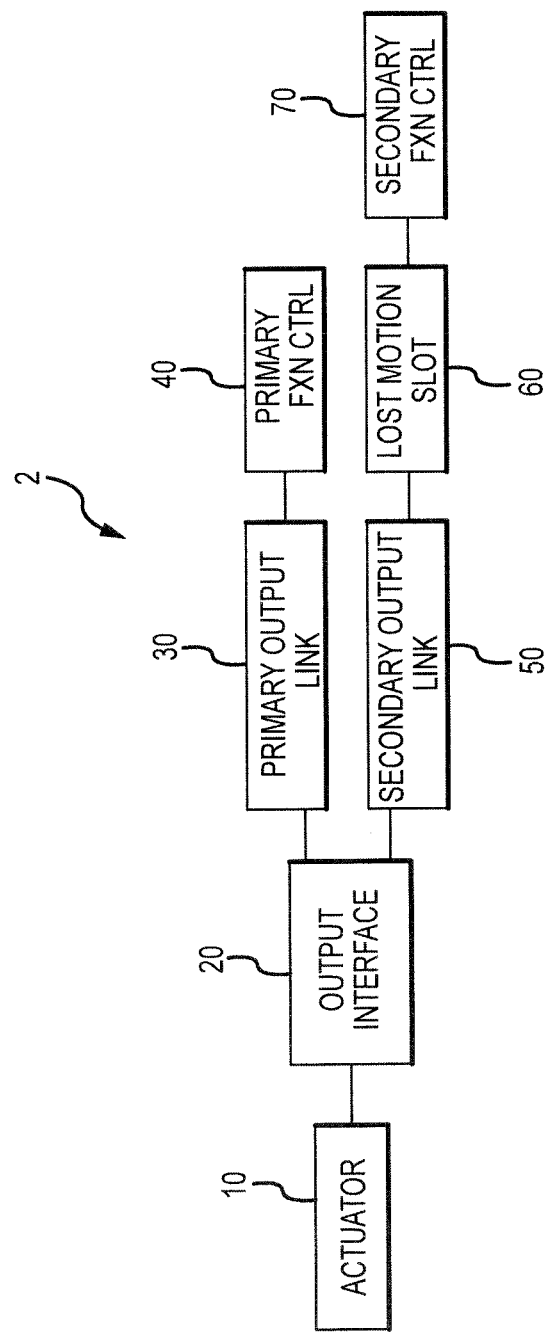
FIG. 1 illustrates a block diagram of an example multi-function seat actuator system, in accordance with various embodiments.

In various embodiments, a seat may comprise an actuation system. The seat may have multiple control functions, for example, a floor tracking control function to control the forward-aft position of the seat in a floor track, and a seat pan track and swivel control function to control the position of the seat pan of the seat. It may be desired to combine the operation of these different functions under the control of a single actuator. Thus, with reference to FIG. 1, a seat actuation system may comprise an actuator 10, an output interface 20, a primary output link 30, a primary function control 40, a secondary output link 50, a lost motion slot 60, and a secondary function control 70.

The actuator 10 may comprise a rotary actuator. For example, the actuator 10 may comprise an electric motor. In further embodiments, the actuator 10 may comprise various gears to vary the speed and torque of the electric motor. The actuator 10 may be connected to an output interface 20.

The output interface 20 may comprise an output device attached to the actuator 10 whereby the rotational movement of the rotary actuator may be harnessed to perform work. For example, the output interface 20 may comprise a bell crank, or a disc, or any other apparatus whereby the circular motion of the actuator 10 may be converted into reciprocating motion. The output interface 20 may be connected to a primary output link 30 and a secondary output link 50. The primary output link 30 and the secondary output link 50 may be connected to the output interface 20 at different locations, and/or in different manners, for example, so that a primary function controlled by primary output link 30 and a secondary function controlled by the secondary output link 50 may be controlled independently of one another, despite the actuator 10 only operating in a limited motion domain, such as a rotation domain.

The primary output link 30 may comprise any mechanical interconnection whereby work done by the actuator 10 in articulating the output interface 20 may be conveyed to a primary function control 40 whereupon the work may be exerted. In various embodiments, the primary output link 30 comprises a cable by which tension may be imparted onto a primary function control 40 by the output interface 20.

The secondary output link 50 may comprise any mechanical interconnection whereby work done by the actuator 10 in articulating the output interface 20 may be conveyed to a secondary function control 70 whereupon the work may be exerted. In various embodiments, the secondary output link 50 further comprises a bell crank by which rotational movement of the output interface 20 may be converted into translational movement of a secondary function control 70. A lost motion slot 60 may be disposed between the secondary output link 50 and the secondary function control 70 in order to isolate the secondary function control 70 from the primary function control 40. For example, by implementing a lost motion slot 60 in the interconnection between the secondary output link 50 and the secondary function control 70, motion of the output interface 20 which imparts work on the primary function control 40 may be isolated from imparting work on the secondary function control 70, because the distance over which the work is performed lies within the envelope of the lost motion slot 60.

The lost motion slot 60 may comprise an aperture disposed through the secondary output link 50. Alternatively, the lost motion slot 60 may comprise an aperture disposed through a lost motion member positioned between the secondary output link 50 and the secondary function control 70. In various embodiments, the lost motion slot 60 may comprise an aperture disposed through the secondary function control 70. The lost motion slot 60 may have any shape, orientation, and length, whereby the operation of the primary function control 40 and the secondary function control 70 may be isolated. For example, the output interface 20 may convert the rotary movement of the actuator 10 into translational movement of the primary output link 30 and/or the secondary output link 50. In response to various amounts of rotary movement, it may be desirable to convert the rotary movement into translational movement of only one of the primary output link 30 and secondary output link 50. By incorporating one or more lost motion slots, one or more lost motion slot null zones may be incorporated whereby a different degree of rotary movement and/or a different direction of rotary movement is associated with engaging (e.g., translating) the primary function control 40 than engaging (e.g., translate) the secondary function control 70.

Figure 2:
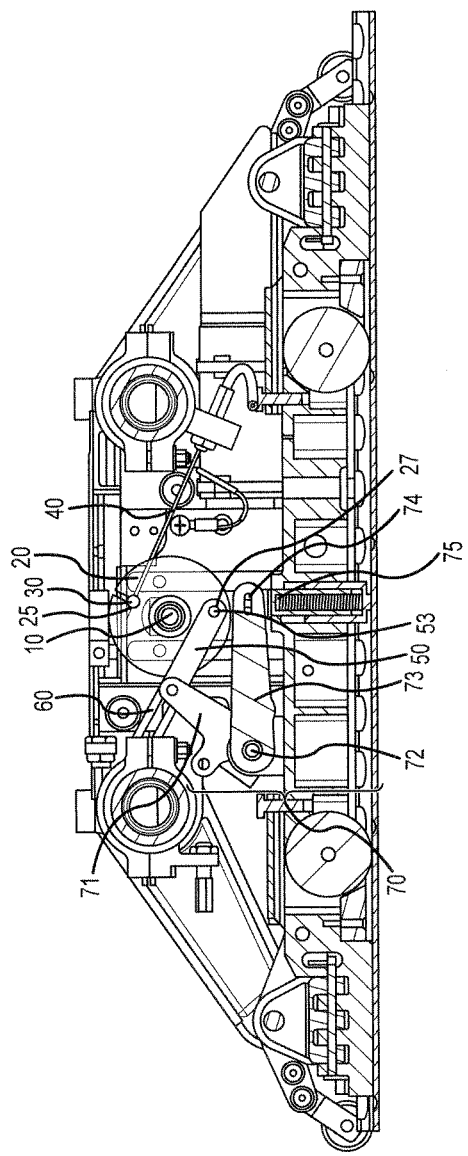
FIG. 2 illustrates a detailed view of an example multi-function seat actuation system, in accordance with various embodiments.

Having discussed various aspects of a block diagram of a multi-function seat actuator, attention is further directed to FIG. 2, which illustrates various embodiments of a multi-function seat actuator system. Further embodiments, combinations of features, and variations are contemplated, however.

With reference to FIG. 2, an actuator 10 may comprise a rotary actuator disposed within a seat base. The actuator 10 may be in mechanical communication with an output interface 20 comprising a disc. As the actuator 10 rotates, for example, counterclockwise, the primary output link 30 rides within an aperture 25 disposed in the output interface 20. As the disc rotates, the primary output link 30 translates according to the rotation and tension is exerted on primary function control 40. In various embodiments, primary function control 40 comprises a cable linkage whereby the latch of a seat pan track/swivel release may be activated so that the seat pan of a seat may move in one or more degrees of freedom. Thus, it may be said that a primary function control 40 comprises a seat pan track and swivel control.

The output interface 20 may further be in mechanical communication with a secondary output link 50. The secondary output link 50 may comprise a rigid shaft having a post 53 disposed at one end and riding within an aperture 27 disposed in the output interface 20. As the disc rotates, the secondary output link 50 translates according to the rotation. A lost motion slot 60 may comprise an aperture disposed through the rigid shaft comprising the secondary output link 50 and extending along a length of the rigid shaft. The secondary function control 70 may interconnect with the secondary output link 50, via post disposed within this lost motion slot 60. Accordingly, as the secondary output link 50 translates, no work is done on the secondary function control 70. In various embodiments, no work is done on secondary function control 70, in response to rotation of the output interface 20 in a counterclockwise direction. For example, the slippage of the interface between the secondary function control 70 and the secondary output link 50 may prevent work from being done on secondary function control 70 in response to rotation of the output interface 20 in a counterclockwise direction. However, in further embodiments, the slippage of the interface between the secondary function control 70 and the secondary output link 50 only prevents work from being done on secondary function control 70 during a portion of the arc length of the rotation of the output interface 20 in a counterclockwise direction. In such embodiments, no work is done until the secondary output link 50 translates a sufficient distance to overcome the slippage of the interface between the secondary function control 70 and the secondary output link 50. Thus, one or more lost motion slot may be arranged to permit work to be done on various function controls in response to various degrees of rotation of the output interface 20, and various directions of rotation of the output interface 20.

In various embodiments, the actuator 10 may be configured to rotate in both a clockwise and a counterclockwise direction. For example, the output interface 20 may be arranged to convey work to the secondary function control 70 during clockwise rotation, and return the secondary function control 70 to a neutral position during counterclockwise rotation. Similarly, the output interface 20 may be arranged to convey work to the primary function control 40 during counterclockwise rotation and return the primary function control 40 to a neutral state during clockwise rotation. During counterclockwise rotation, the lost motion slot 60 may prevent work to be performed on the secondary function control 70, and yet allow work to be performed on the primary function control 40. During clockwise rotation, the lost motion slot 60 may be of a size and shape that the secondary output link 50 engages the secondary function control 70 and performs work on the secondary function control 70. Moreover, because the primary function control 40 may comprise a cable, further clockwise rotation may simply increase the slack of the cable, while the primary function control 40 may be said to remain in a neutral position.

Thus, one may appreciate that the output interface 20 may also be arranged to convey work to one function control, for example, the primary function control 40 during counterclockwise rotation, and then to convey work to the another function control, for example, the secondary function control 70 during clockwise rotation. Alternatively, the output interface 20 may be arranged to convey work to one function control during rotation comprising a first arc angle of rotation and convey work to another function control during rotation comprising a second arc angle of rotation, where the first arc angle and second arc angle are different. Moreover, any number of function controls may be implemented, according to the principles discussed herein. Thus, various bell cranks, lost motion slots, cables, and other apparatuses may be combined to combine different function controls, additional function controls, or permit actuation of multiple function controls independently and/or simultaneously.

Various actuator null zones may be implemented. For example, an actuator null zone may comprise an arc length of rotation such as in the actuator 10 and/or in any control software of the actuator 10 so that the actuator 10 may refrain from operating one or more control function in response to instructions directing it to rotate an arc length insufficient to activate one or more function control. For example, if the actuator 10 receives an instruction to rotate only to a degree that would partially operate the secondary function control 70 or the primary function control 40, the actuator 10 may refrain from operating. In this manner, the actuator 10 may be prevented from responding to momentary or incomplete instructions, or from only partially operating a control function.

With ongoing reference to FIG. 2, a secondary function control 70 may further comprise an input arm 71, a crank axis 72, an output arm 73, a pin coupling receiver 74, and a translating member 75. The input arm 71 may be mechanically connected to the output arm 73 about the crank axis 72. Thus, as the input arm 71 is rotated about the crank axis 72, the output arm 73 rotates in response. The pin coupling receiver 74 may be disposed at the outermost end of the output arm 73 and may receive the translating member 75. In this manner, as the output arm 73 rotates about the crank axis 72, the translating member 75 may be translated in a linear direction. The pin coupling receiver 74 may facilitate the translating by preventing the transmission of an angular component of the motion of the output arm 73 to the translating member 75.

In various embodiments, the translating member 75 may be a floor tracking linkage pin. As the translating member 75 articulates in a linear direction, the end of the translating member 75 (e.g. the tip of the floor tracking linkage pin) may be lifted from slots disposed within a track on a vehicle floor, or may be lowered into slots disposed within a track on a vehicle floor. In this manner, the seat may be permitted to move relative to the slots, or may be prevented from moving relative to the slots. Thus, it may be said that the secondary function control 70 comprises a floor tracking control.

Figure 3:
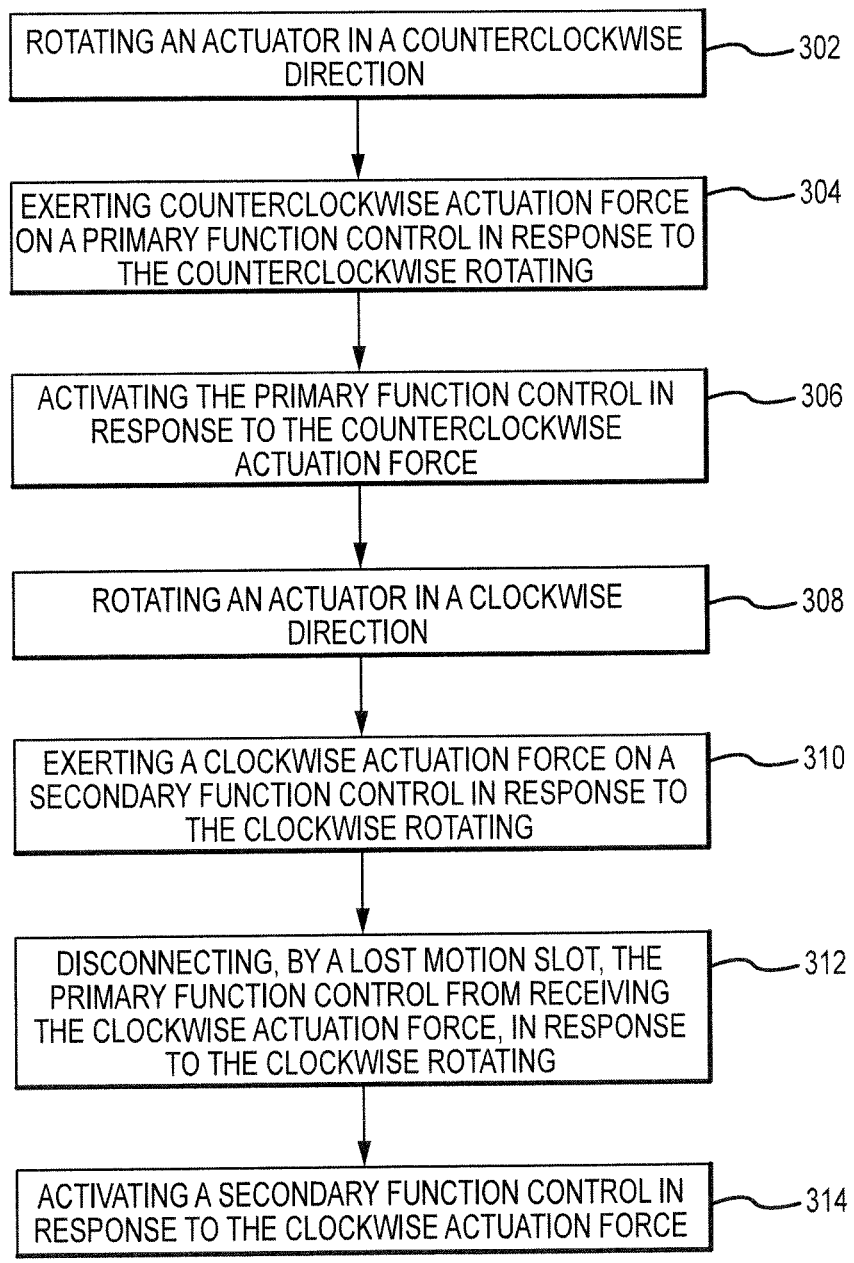
FIG. 3 illustrates an example method of operating an example multi-function seat actuator in accordance with various embodiments.

Having discussed various aspects of a multi-function seat actuator system, a multi-function seat actuator system may operate according to different methods. For example, with reference to FIGS. 2 and 3, a method 300 may include rotating an actuator 10 in a counterclockwise direction (Step 302). The method may further include exerting counterclockwise actuation force on a primary function control 40 in response to the counterclockwise rotating (Step 304), and activating the primary function control 40 in response to the counterclockwise actuation force (Step 306). Similarly, the actuator 10 may be rotated in a clockwise direction (Step 308). A clockwise actuation force may be exerted on a secondary function control 70 in response to the clockwise rotating (Step 310), and a lost motion slot 60 may disconnect the primary function control 40 from receiving the clockwise actuation force, in response to the clockwise rotating (Step 312). Consequently, a secondary function control 70 may be activated in response to the clockwise actuation force while the primary function control 40 remains unactivated (Step 314).

Having discussed various aspects of a multi-function seat actuator system, a multi-function seat actuator system may be made of many different materials or combinations of materials. For example, various components of the system may be made from metal. For example, various aspects of an multi-function seat actuator system may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of a multi-function seat actuator system as disclosed herein are made of different materials or combinations of materials, and/or may comprise coatings.

In various embodiments, a multi-function seat actuator system may comprise multiple materials, or any material configuration suitable to enhance or reinforce the resiliency and/or support of the system when subjected to wear in an aircraft operating environment or to satisfy other desired electromagnetic, chemical, physical, or material properties, for example radar signature, weight, strength, electrical conductivity, fire resistance, or heat tolerance.

In various embodiments, various components may comprise an austenitic nickel-chromium-based alloy such as Inconel®, which is available from Special Metals Corporation of New Hartford, N.Y., USA. In various embodiments, various components may comprise ceramic matrix composite (CMC). Moreover, various aspects may comprise refractory metal, for example, an alloy of titanium, for example titanium-zirconium-molybdenum (TZM).

While the systems described herein have been described in the context of aircraft applications; however, one will appreciate in light of the present disclosure, that the systems described herein may be used in various other applications, for example, different vehicles, such as cars, trucks, busses, trains, boats, and submersible vehicles, space vehicles including manned and unmanned orbital and sub-orbital vehicles, or any other vehicle or device, or in connection with industrial processes, or seats, or any other system or process having need for actuators.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A seat actuation system comprising:
an actuator connected to a disc;
a primary output link in mechanical communication with the disc;
a secondary output link in mechanical communication with the disc,
wherein comprises a first movement of the actuator is conveyed to the primary output link via the disc and a second movement of the actuator is conveyed to the secondary output link via the disc;
a primary function control movable by the primary output link;
a secondary function control movable by the secondary output link;
a lost motion slot disposed between the secondary function control and the secondary output link such that the secondary function control is connected to the secondary output link via the lost motion slot, whereby the secondary function control is mechanically isolated from the first movement of the actuator.

2. The seat actuation system according to claim 1, wherein the actuator comprises a rotary actuator.

3. The seat actuation system according to claim 1, wherein the secondary output link comprises a rigid shaft.

4. The seat actuation system according to claim 3, wherein the lost motion slot comprises an aperture extending through the secondary output link.

5. The seat actuation system according to claim 4, wherein the secondary function control comprises an input arm in mechanical communication with the lost motion slot.

6. The seat actuation system according to claim 5, wherein the secondary function control further comprises:
an output arm connected to the input arm at a crank axis, wherein the crank axis is disposed at a junction of the input arm and the output arm,
whereby the input arm and the output arm may rotate together.

7. The seat actuation system according to claim 6, further comprising:
a pin coupling receiver disposed in the output arm; and
a translating member in mechanical communication with the pin coupling receiver,
whereby a rotational movement of the output arm about the crank axis is converted into a linear translation of the translating member.

8. The seat actuation system according to claim 1, wherein the primary output link comprises a cable.

9. The seat actuation system according to claim 1, wherein a cable of the primary output link selectably enables and disables a seat pan track and swivel function.

10. The seat actuation system according to claim 7, wherein the translating member is at least one of lifted from and lowered into slots disposed within a track.

11. The seat actuation system according to claim 10, wherein the translating member selectably enables and disables a floor tracking function.

12. A seat actuation system comprising:
an actuator connected to an output interface;
a primary output link in mechanical communication with the output interface;
a secondary output link in mechanical communication with the output interface, wherein the secondary output link comprises a rigid shaft,
wherein the output interface comprises an apparatus whereby a first movement of the actuator is conveyed to the primary output link and a second movement of the actuator is conveyed to the secondary output link;
a primary function control movable by the primary output link;
a secondary function control movable by the secondary output link, wherein the secondary function control comprises an input arm and an output arm connected to the input arm at a crank axis disposed at a junction of the input arm and the output arm, whereby the input arm and the output arm may rotate together;
a lost motion slot disposed between the secondary function control and the secondary output link, wherein the lost motion slot comprises an aperture extending through the secondary output link that is connected to the input arm of the secondary function control, whereby the secondary function control is mechanically isolated from the first movement of the actuator.

* * * * *